United States Patent
John et al.

(10) Patent No.: US 12,516,638 B2
(45) Date of Patent: Jan. 6, 2026

(54) DUAL FUEL ENGINE COMBUSTION CONTROL STRATEGY OPTIMIZING PILOT SHOT QUANTITIES

(71) Applicant: Caterpillar Inc., Peoria, IL (US)

(72) Inventors: Bobby John, Peoria, IL (US); Jonathan W. Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/602,362

(22) Filed: Mar. 12, 2024

(65) Prior Publication Data
US 2025/0290458 A1    Sep. 18, 2025

(51) Int. Cl.
*F02D 41/40* (2006.01)
*F02D 19/06* (2006.01)

(52) U.S. Cl.
CPC ....... *F02D 19/061* (2013.01); *F02D 19/0613* (2013.01); *F02D 19/0647* (2013.01)

(58) Field of Classification Search
CPC .... F02D 41/403; F02D 41/402; F02D 35/023; F02D 41/0027; F02D 19/10; F02D 19/06; F02D 19/0647; F02D 19/0639; F02D 19/0642; F02D 19/081; F02D 19/105; F02D 41/40; F02D 41/1475; F02D 41/2454; F02D 2250/32; F02M 43/04; F02M 43/00; F02P 19/026
USPC .......................... 123/27 GE, 27 R, 299, 525
See application file for complete search history.

(56) References Cited

U.S. PATENT DOCUMENTS

| | | | |
|---|---|---|---|
| 6,032,617 A | 3/2000 | Willi et al. | |
| 6,915,776 B2 | 7/2005 | Cummins | |
| 8,437,945 B2 * | 5/2013 | Haskara | F02D 35/023 701/111 |
| 8,516,991 B2 | 8/2013 | Tanno et al. | |
| 9,234,472 B2 | 1/2016 | Caterpillar | |
| 10,458,346 B2 | 10/2019 | Woodward | |
| 11,035,317 B2 | 6/2021 | Caterpillar | |
| 11,415,041 B2 | 8/2022 | Woodward | |

(Continued)

FOREIGN PATENT DOCUMENTS

| | | | |
|---|---|---|---|
| JP | H09264160 A | * | 10/1997 |
| JP | 6519520 B2 | * | 5/2019 |
| WO | 2018091781 A1 | | 5/2018 |

OTHER PUBLICATIONS

Written Opinion and International Search Report for Int'l. Patent Appln. No. PCT/US2025/017138, mailed May 19, 2025 (11 pgs).

*Primary Examiner* — George C Jin
*Assistant Examiner* — Teuta B Holbrook
(74) *Attorney, Agent, or Firm* — Brannon Sowers & Cracraft

(57) ABSTRACT

An engine system operating and control strategy includes autoigniting a directly injected pilot fuel to ignite a primary fuel in a cylinder in a first engine cycle. The strategy further includes comparing data indicative of a heat release in a cylinder in the first engine cycle to phasing error criteria for an earlier pilot shot of the pilot fuel and a later shot of the pilot fuel. A quantity of one or more pilot shots in a subsequent engine cycle is varied, based on the comparison. Pilot shot quantity can be varied closed loop to obtain desired combustion phasing characteristics, such as when a characteristic of a primary fuel is changed during operation. Related apparatus and control logic is also disclosed.

20 Claims, 3 Drawing Sheets

(56) References Cited

U.S. PATENT DOCUMENTS

| | | |
|---|---|---|
| 2006/0288979 A1 | 12/2006 | Ancimer et al. |
| 2016/0097338 A1 | 4/2016 | Jenbacher |
| 2019/0040805 A1 | 2/2019 | Woodward |
| 2019/0136791 A1 | 5/2019 | Kurtz et al. |
| 2020/0263627 A1 | 8/2020 | Anders et al. |
| 2020/0291875 A1* | 9/2020 | Anders ................ F02D 41/403 |

* cited by examiner

DUAL FUEL ENGINE COMBUSTION CONTROL STRATEGY OPTIMIZING PILOT SHOT QUANTITIES

TECHNICAL FIELD

The present disclosure relates generally to a dual fuel engine control strategy, and more particularly to varying a quantity of a shot of a pilot fuel based on phasing error criteria.

BACKGROUND

Internal combustion engines are well-known and used throughout the world for vehicle propulsion, generation of electrical power, operations of pumps and compressors, and in various other industrial applications. In a conventional operating scheme, fuel and air is combusted in an engine cylinder to produce a rapid rise in pressure and drive a piston coupled to a crankshaft. Spark-ignited engines typically employ a liquid petroleum distillate fuel such as gasoline, or certain gaseous fuels such as natural gas, methane, propane, and various mixtures. Compression-ignition engines typically utilize fuels such as diesel distillate fuel, biodiesel, and still others. There has been significant research interest in recent years in engines and operating strategies that are flexible with regard to fuel utilization, particularly gaseous fuels. Fuel prices can be fairly dynamic, and various fuels such as gaseous fuels can have desirable combustion or emissions properties which are sought to be exploited.

One type of engine design that can produce lower amounts of certain emissions and is flexible with regard to fuel type combines both a compression-ignition fuel such as diesel and a gaseous fuel such as natural gas. Compression-ignition fuels and spark-ignited gaseous fuels each have both advantages and drawbacks, and dual fuel engine strategies attempt to balance such factors. Diesel fuels are relatively easier to compression-ignite but tend to produce certain undesired emissions. Gaseous fuels can have a range of fuel quality depending upon the type of gaseous fuel and its source. For example, gaseous fuels relatively richer in methane tend to compression ignite relatively less easily than those containing certain longer chain hydrocarbons, and, as a result, different fuel blends can have varying tendencies to knock or produce other forms of undesired combustion.

It is generally desirable in dual fuel applications to utilize as little liquid fuel, such as diesel fuel, as is practicable since the diesel combustion even while small can still produce undesired emissions and have higher costs than the gaseous fuel. As combustion scientists have experimented with relatively tiny amounts of diesel fuel for igniting a larger charge of gaseous fuel, practical and commercial success has often proven elusive, particularly compounded by variations in fuel quality or composition of the available gaseous fuel. One example of a dual fuel engine employing a diesel pilot fuel to ignite natural gas is known from U.S. Pat. No. 6,032,617 to Willi et al.

SUMMARY

In one aspect, a method of operating an engine system includes directly injecting an earlier shot and a later shot of a pilot fuel into a cylinder in an engine in a first engine cycle, and autoigniting the pilot fuel to ignite a primary fuel in the cylinder in the first engine cycle. The method further includes receiving data indicative of a heat release in the cylinder in the first engine cycle, and comparing the data to a first phasing error criterion for the earlier shot and to a second phasing error criterion for the later shot. The method still further includes varying a quantity of at least one shot of the pilot fuel in the subsequent engine cycle, based on the comparing the data to the first phasing error criterion and to the second phasing error criterion.

In another aspect, an engine system includes an engine having a cylinder formed therein, and a piston movable in the cylinder. The engine system further includes a direct fuel injector arranged to directly inject pilot shots of a pilot fuel into the cylinder, and a primary fuel admission valve for admitting a primary fuel for combustion in the cylinder. The engine system further includes a fuel control system having a sensor structured to produce data indicative of a heat release in the cylinder, and a fueling control unit. The fueling control unit is structured to compare the data to phasing error criteria for an earlier shot of the pilot fuel and for a later shot of the pilot fuel in a first engine cycle. The fueling control unit is further structured to vary a quantity of at least one shot of the pilot fuel in a subsequent engine cycle, based on the comparing the data to the phasing error criteria.

In still another aspect, a dual fuel control system includes a fueling control unit structured to receive data indicative of a heat release in a cylinder produced in a first engine cycle by combustion of a fuel charge including a primary fuel and a plurality of shots of an autoignited pilot fuel. The fueling control unit is further structured to compare the data to phasing error criteria for the plurality of autoignited shots of the directly injected pilot fuel, and to produce a combustion phasing error signal based on the comparison of the data to the phasing error criteria. The fueling control unit is further structured to output a pilot fuel injection command varying a quantity of at least one shot of the pilot fuel in a subsequent engine cycle, based on the combustion phasing error signal.

DETAILED DESCRIPTION

Figure 1:
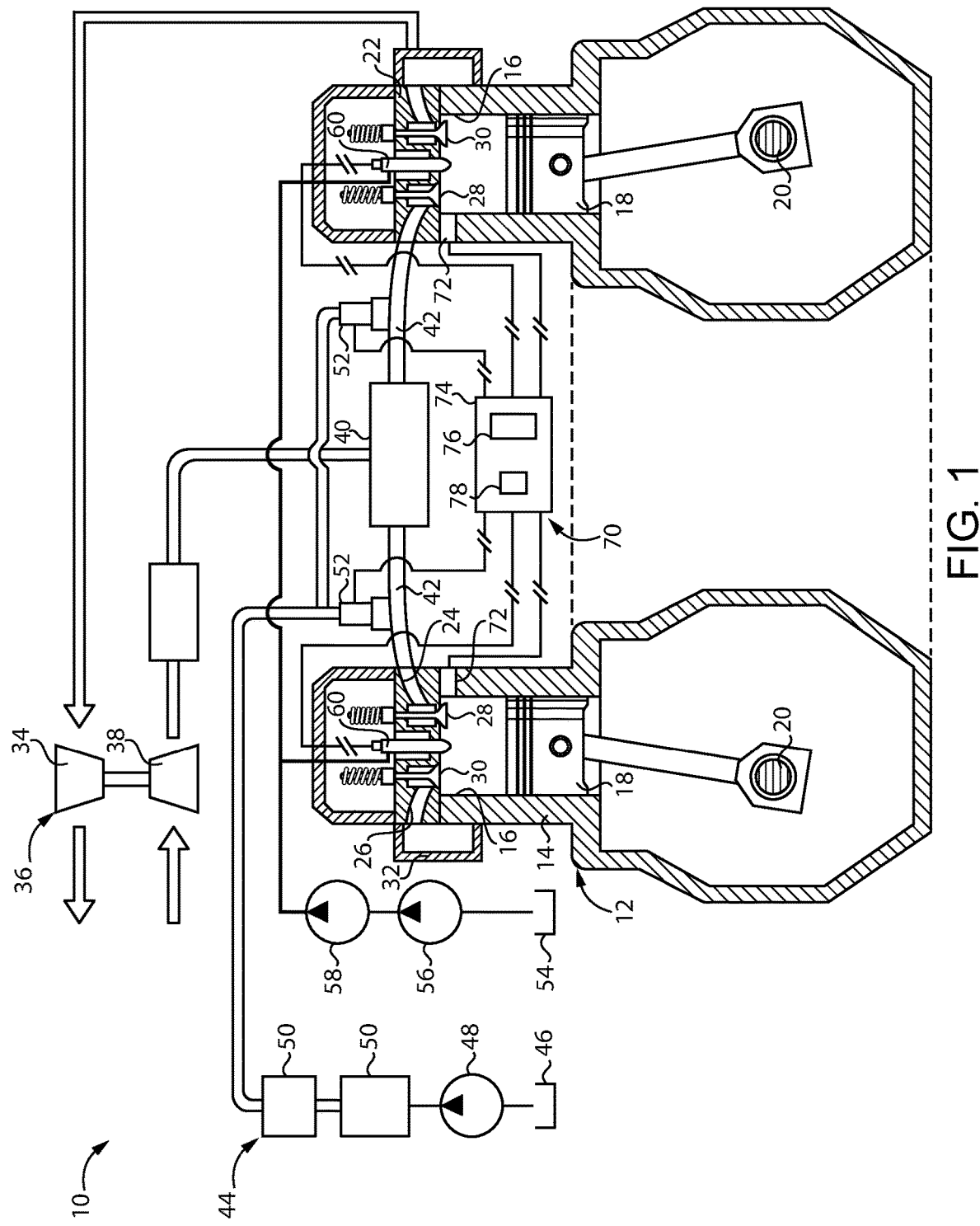
FIG. 1 is a diagrammatic view of a dual fuel internal combustion engine system, according to one embodiment.

Referring to FIG. 1, there is shown a dual fuel internal combustion engine system 10, according to one embodiment. Engine system 10 includes an internal combustion engine 12 having an engine housing 14 with a plurality of cylinders 16 formed therein. Pistons 18 are within cylinders 16 and movable between a bottom-dead-center position and a top-dead-center position in a generally conventional manner to rotate a crankshaft 20. Engine system 10 may be used in applications such as rotating an electrical generator, operating a driveline in a land vehicle or a marine vessel, or operation of a pump or a compressor to name a few examples.

Engine housing 14 also includes a cylinder head 22. Cylinder head 22 forms an intake port 24 and an exhaust port 26 associated with each respective cylinder 16. One or more intake valves 28 and one or more exhaust valves 30 are supported in cylinder head 22 and movable to open and close fluid communications between the respective cylinder 16 and the respective intake port 24 and exhaust port 26. An exhaust manifold 32 receives a flow of exhaust from cylinders 16 and feeds the same to a turbine 34 in a turbocharger 36. Turbocharger 36 includes a compressor 38 to pressurize intake air and feed the same to an intake manifold 30. Intake runners 42 extend between intake manifold 30 and each intake port 24. Engine system 10 could include any number of cylinders in any suitable arrangement, such as an inline pattern, a V-pattern, or in any other suitable arrangement. Discussion and description herein of cylinder 16, or other elements or components in the singular, should be understood to refer generally to any of a plurality of like elements or components except where otherwise indicated. Engine system 10 may operate in a conventional four-stroke cycle, although the present disclosure is not limited as such, and alternatives including various forms of variable valve actuation (VVA) timing are within the scope of the present disclosure.

Engine system 10 further includes a fuel system 44. Fuel system 44 includes a primary fuel supply 46 containing a suitable primary fuel including but not limited to natural gas, methane, ethane, propane, E85, gasoline, methanol, ethanol, or naphtha. In some embodiments, primary fuel supply 46 stores the primary fuel in a cryogenically liquefied state, such as liquified natural gas (LNG). In others the primary fuel could be stored in a pressurized gaseous state and/or supplied as so-called "line gas" from a commercial gas distribution network, a mine, a landfill, or a wellhead, for example. It should be appreciated that engine system 10 could operate on various blends of hydrocarbon gaseous fuels, hydrocarbon gaseous fuels blended with gaseous molecular hydrogen, or still others.

Fuel system 34 further includes equipment 50 such as vaporization and/or pressurization equipment for the primary fuel, that feeds the primary fuel to a plurality of fuel admission valves 52 each associated with one cylinder 16. In the illustrated embodiment admission valves 52 are arranged to admit a gaseous fuel into intake runners 32 or directly into intake ports 24. Other embodiments could include admission of a gaseous fuel into intake manifold 40, or potentially directly into cylinder 16 by way of direct injection.

Fuel system 44 also includes a pilot fuel supply 54. Pilot fuel supply 54 contains a suitable compression-ignition liquid fuel, such as a diesel distillate fuel, a renewable diesel fuel, biodiesel, various blends of these, or potentially a lower cetane fuel blended with a cetane enhancer. Fuel system 44 also includes a low-pressure transfer pump 56, and a high-pressure pump 58 structured to pressurize the pilot fuel to an injection pressure for direct injection in a plurality of shots as further discussed herein into each respective cylinder 16. Engine system 10 may also be operated in a so-called diesel-only mode as will be familiar to those skilled in the art.

It has been observed that fuels can vary in certain fuel characteristics depending upon the supplier, the preferences of the operator, or upon natural variation in composition or contaminants, processing techniques, or other factors. For example, a supply of a gaseous fuel can vary in energy content based upon the relative proportions of various hydrocarbon constituents. Engine system 10 may be operated relatively stoichiometrically lean for various purposes including emissions optimization. Engines operated relatively stoichiometrically lean can be relatively sensitive to perturbations in fuel energy content, resulting in undesired emissions levels, abnormal combustion, and/or reduced efficiency, for example. As will be further apparent from the following description, engine system 10 may be configured for optimal operation and compensation for changes in fuel characteristics by way of adjustments to pilot fuel shot quantities.

To this end, engine system 10 also includes a dual fuel control system 70. Dual fuel control system 70 includes a sensor 72 structured to produce data indicative of a heat release in cylinder 16. In an embodiment, each cylinder 16 is equipped with a sensor 72. Each sensor 72 may be an in-cylinder pressure sensor structured to monitor cylinder pressures in an engine cycle having a known or determinable direct relationship with a heat release in cylinder 16 caused by combustion of a fuel charge including the primary fuel and a plurality of shots of autoignited pilot fuel. Monitoring in-cylinder pressure enables tracking a heat release rate (HRR) associated with combustion in an engine cycle. The tracked HRR relative to an engine timing such as crank angle timing will be appreciated to represent combustion phasing.

Dual fuel control system 70 also includes a fueling control unit 74. Fueling control unit 74 may include a memory 76 storing computer executable instructions, and a data processor 78 structured to execute the instructions to cause dual fuel control system 70 to operate engine system 10 according to the present disclosure. Fueling control unit 74 could include any number of computer readable memories and any number of data processors resident upon the same device or distributed among multiple devices. Any suitable volatile or non-volatile computer readable memory, such as RAM, ROM, FLASH, etc., and any suitable data processor such as a microprocessor or a microcontroller, may be used.

Fueling control unit 74 may be structured to receive the data indicative of the heat release in cylinder 16 produced in a first engine cycle by combustion of a fuel charge as discussed herein. Fueling control unit 74 may be further structured to compare the data to phasing error criteria for the plurality of autoignited shots of directly injected pilot fuel. In an embodiment, fueling control unit 74 compares the data to a first phasing error criterion for an earlier shot and to a second phasing error criterion for a later shot. Each of the first phasing error criterion and the second phasing error criterion may include an HRR-based limit, including a first HRR-based limit and a second HRR-based limit associated with and specific to the earlier shot and the later shot, respectively. For example, an HRR that is observed based upon data from sensor 72 can be compared to a threshold HRR that is associated with an undesired timing or undesired amplitude of combustion phasing.

A first HRR-based limit for an earlier shot may include an HRR-based limit at a later crank angle timing, and a second HRR-based limit for a later shot may include an HRR-based limit at an earlier crank angle timing. Based upon the comparison of the data to the phasing error criteria, fueling control unit 74 can produce one or more combustion phasing error signals. For example, fueling control unit 74 may perform a comparison determining if an observed HRR is below a threshold HRR at a predetermined crank angle timing and, if so, produce a combustion phasing error signal. Various extensions and alternatives implementing HRR-based limits associated with an earlier shot and a later shot are within the scope of the present disclosure. A first HRR-based limit for an earlier shot and a second HRR-based limit for a later shot can be empirically determined, for example. Fueling control unit 74 may be further structured to output a pilot fuel injection command varying a quantity of at least one shot of the pilot fuel in a subsequent engine cycle, based on the combustion phasing error signal(s).

The strategy described reflects insights as to combustion phasing characteristics that differ in response to factors such as insufficient shot quantity and/or inconsistent spray characteristics of the different shots of the pilot fuel. Stated another way, the nature of errors in combustion phasing associated with an earlier shot of pilot fuel may differ from errors in combustion phasing associated with a later shot of pilot fuel.

It will also be recalled that certain engine systems, of which engine system 10 is an example, may be relatively sensitive to varying characteristics of a primary fuel. A varying characteristic of a primary fuel could result from a difference in blend ratio, contaminants, or other external factors as discussed herein. Varied fuel characteristics might also result merely because an operator chooses to transition from one fuel type to a second fuel type or from one fuel supply source to a second fuel supply source, based upon cost, availability, applicable emissions requirements, or still other factors.

Engine system 10 may be understood to be configured to compensate for such changes in fuel characteristics. As discussed above, fueling control unit 74 outputs a pilot fuel injection command varying a quantity of one or more shots of the pilot fuel in a subsequent engine cycle. In a practical implementation, fueling control unit 74 outputs a pilot fuel injection command varying a quantity of an earlier shot in a subsequent engine cycle based on a combustion phasing error signal associated with an earlier pilot shot in a first engine cycle, and outputs a pilot fuel injection command varying a quantity of a later shot of the pilot fuel in a subsequent engine cycle based on a combustion phasing error signal associated with a later shot in the first engine cycle. These principles will be further apparent in view of the illustrations further discussed below.

Figure 2:
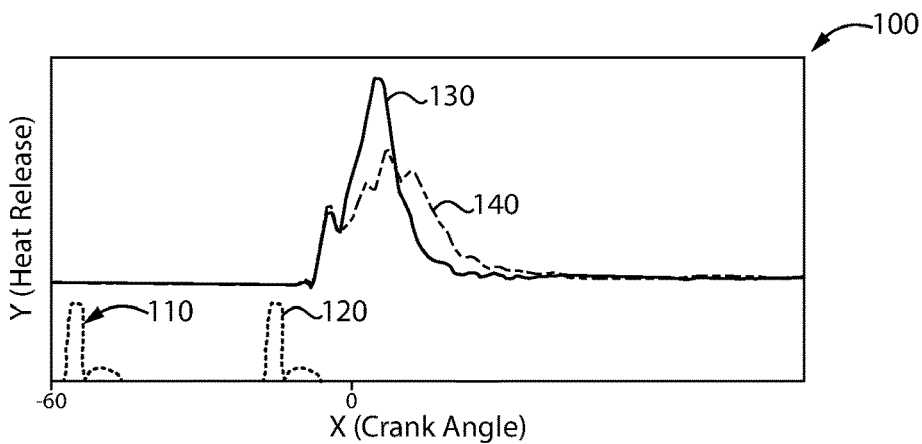
FIG. 2 is a graph of heat release data compared to a desired heat release in an engine cycle.

Referring to FIG. 2, there is shown a graph 100 illustrating an earlier pilot shot of a pilot fuel 110 and a later pilot shot of a pilot fuel 120. Curve 130 shows an example desired combustion phasing profile as indicated by HRR data acquired from the associated cylinder in an engine cycle. Curve 140 is based on actual test data for HRR observed where an earlier pilot shot quantity is insufficient. It can be noted that curve 140 is generally similar in shape initially to curve 130 but shows an increased HRR later in the engine cycle as compared to the HRR of curve 130. One way to characterize the difference between curves 140 and 130 is that a CA50-70 parameter is increased, meaning the crank angle range corresponding to approximately 50% to 70% of the total fuel burned in the engine cycle represented by curve 140 is shifted later in time relative to curve 130. Fueling control unit 74 can detect and act upon such a shift whenever observed to bring combustion phasing closer in line to that of the desired curve 130.

Figure 3:
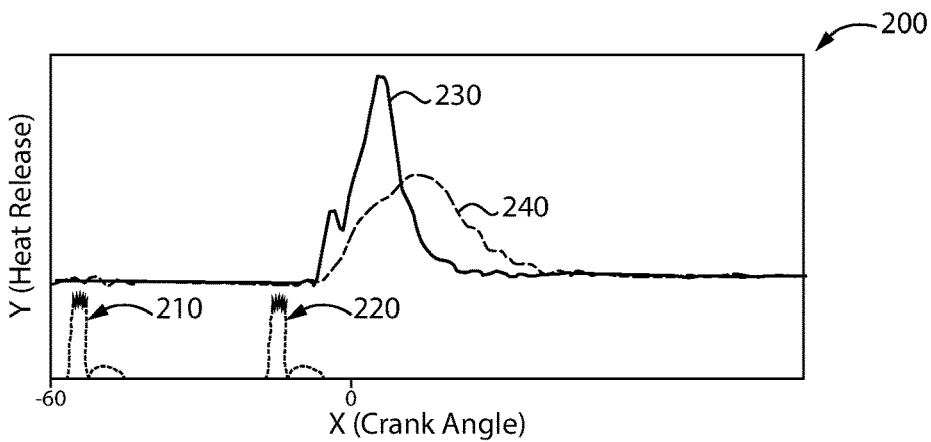
FIG. 3 is another graph of heat release data compared to a desired heat release in an engine cycle.

Referring now to FIG. 3, there is shown a graph 200 illustrating an earlier shot 210, a later shot 220, a desired combustion phasing profile via curve 230, and a curve 240 based on test data where a quantity of a later shot of pilot fuel is insufficient or a quality of the later pilot shot is suboptimal, for example, due to fuel spray jet variations amongst spray plumes in the injection of the later shot. It can be noted that curve 240 shows retarding of heat release relatively early in the engine cycle as compared to curve 230. One way to characterize the difference between curves 240 and 230 is that a CA10 parameter is retarded, meaning that the crank angle corresponding to approximately 10% of the total fuel burned in the engine cycle represented by curve 240 is shifted in time relative to curve 230. Fueling control unit 74 can detect and act upon such a shift whenever observed to bring combustion phasing closer in line to that of the desired curve 230.

Comparing FIG. 2 to FIG. 3, it can be observed that perturbations to HRR tend to be observed at a relatively earlier crank angle timing where errors in a later shot of pilot fuel occur, and observed at a later crank angle timing where errors in an earlier shot of pilot fuel occur.

Figure 4:
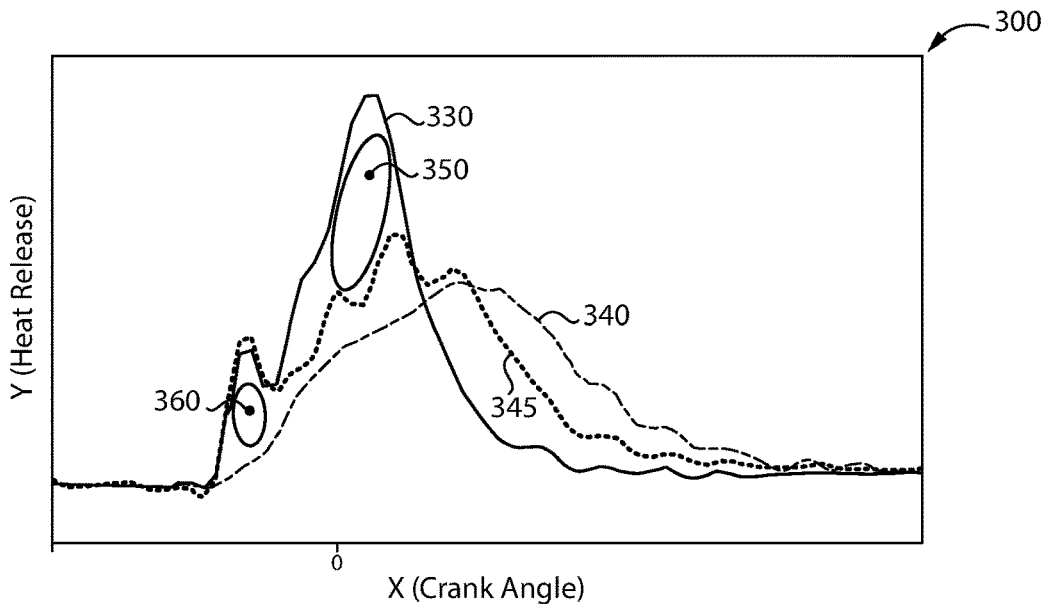
FIG. 4 is yet another graph of heat release data in comparison to a desired heat release in an engine cycle illustrating zones of undesired combustion phasing characteristics.

Turning now to FIG. 4, there is shown another graph 300 illustrating a desired combustion phasing profile at curve 330, a curve 345 that corresponds generally to curve 140 from FIG. 2, and a curve 340 that corresponds generally to curve 240 from FIG. 3. FIG. 4 also illustrates a zone 350 where undesired properties of HRR due to errors in an earlier shot of pilot fuel might be observed, and a zone 360 where undesired properties of HRR due to errors in a later shot of pilot fuel occur. An "error" in a shot of fuel in this context can be understood to include, but is not limited to, an insufficient quantity or a variation in consistency such as a nonuniformity among spray plumes. The present disclosure contemplates controlling the quantity of at least one shot of pilot fuel in a subsequent engine cycle based on the data indicative of heat release obtained from the first engine cycle. Varying the quantity of at least one pilot shot in a subsequent engine cycle can include increasing the quantity so as to vary at least one of a timing parameter or an amplitude parameter of an HRR curve in the subsequent engine cycle.

Thus, in the illustrated embodiment where HRR data is received indicating combustion phasing has shifted into or beyond zone 360, an error signal can be produced and a fuel injection command based on the error signal outputted to vary a quantity of a later shot of pilot fuel in a subsequent engine cycle. Where HRR data is received indicating combustion phasing has shifted into or beyond zone 350, an error signal can be produced and a fuel injection command based on the error signal outputted to vary a quantity of an earlier shot of pilot fuel in a subsequent engine cycle. It will be appreciated that HRR data could motivate in the direction of adjustments to both an earlier shot and a later shot in the same subsequent engine cycle in some instances.

Varying the quantity of at least one shot of the pilot fuel in the subsequent engine cycle may also include varying the quantity according to at least one timing-based fuel burned metric. In a practical implementation, varying the quantity may also include varying the quantity of an earlier pilot shot according to a first metric and varying the quantity of a second pilot shot according to a second metric different from the first metric. Each of the first metric and the second metric may include a timing-based fuel burned metric. The first metric may include a crank angle metric for a relatively larger fuel burned amount, such as 50% or greater. The second metric may include a crank angle metric for a relatively smaller fuel burned amount, such as less than 50%. By way of example, fueling control unit 74 might increase a later shot quantity closed-loop based around a CA10 metric, and might increase an earlier shot quantity closed-loop based around a crank CA50-70 metric.

INDUSTRIAL APPLICABILITY

Figure 5:
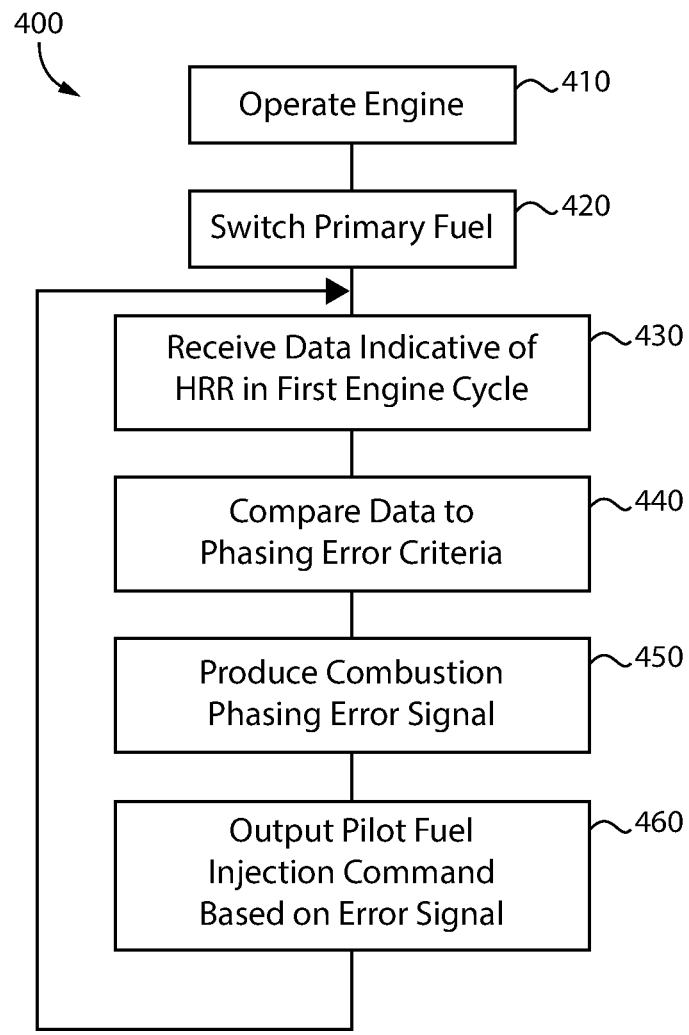
FIG. 5 is a flowchart illustrating example methodology and logic flow, according to one embodiment.

Referring to the drawings generally, but focusing now on FIG. 5, there is shown a flowchart 400 illustrating example methodology and logic flow. Flow chart 400 commences at a block 410 to operate engine 12, feeding the primary fuel via fuel admission valves 52 to cylinders 16 through intake ports 24. At desired timings, direct fuel injectors 60 are electrically actuated to inject an earlier shot and a later shot of the pilot fuel. Potentially more than two shots of the pilot fuel could be injected. The earlier shot might be injected at least 35 degrees, potentially about 60 degrees, before a top-dead-center crank angle position of piston 18. The later shot of the pilot fuel may be injected close to the top-dead-center crank angle position of piston 18, potentially a few degrees prior. Compression-ignition of the directly injected pilot fuel triggers ignition of the primary fuel, typically by way of two merging flame fronts produced by combustion of the respective earlier and later shots.

From block 410, flowchart 400 advances to a block 420 to switch the primary fuel. Switching the primary fuel can include switching from operation on one primary fuel or one primary fuel supply in a preceding engine cycle, to operation on a second primary fuel or a second primary fuel supply in a following (first) engine cycle. As also discussed herein, switching the primary fuel could be performed for a variety of reasons intentionally or unintentionally, but in either case varying a characteristic of the primary fuel such as energy content. From block 420, flowchart 400 advances to a block 430 to receive data indicative of HRR in a first engine cycle as discussed herein. From block 430, flowchart 400 advances to a block 440 to compare the data to phasing error criteria as also discussed herein. The comparison could include a numerical comparison, for example, determining whether a first number indicative of a heat release or an HRR is equal to or less than a second number indicative of the phasing error criteria. Various strategies could employ ranges, rates, multiple numerical factors, multi-dimensional map lookups, complex calculations, or still other factors and/or techniques in the comparison(s) performed at block 440. Referring back to FIG. 4, executing block 440 could include determining whether observed HRR falls in either or both of zone 350 and zone 360. From block 440, flowchart 400 advances to a block 450 to produce a combustion phasing error signal. The error signal could be produced responsive to an observed HRR that is at or below a predetermined threshold HRR as discussed herein.

From block 450, flowchart 400 advances to a block 460 to output one or more pilot fuel injection commands to direct fuel injector 60 based on the error signal(s). From block 460, flowchart 400 may return to block 430 to closed-loop control combustion phasing to reduce the combustion phasing error (s) until a desired combustion phasing profile is obtained. As discussed herein, fueling control unit 74 may output a plurality of fuel injection commands varying a quantity of at least one pilot shot in each of a plurality of subsequent engine cycles according to crank angle timing-based fuel burned metrics for each of earlier pilot shots and later pilot shots.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:
   directly injecting an earlier shot and a later shot of a pilot fuel into a cylinder in an engine in a first engine cycle;
   autoigniting the pilot fuel to ignite a primary fuel in the cylinder in the first engine cycle;
   receiving data indicative of a heat release in the cylinder in the first engine cycle;
   comparing the data to a first phasing error criterion for the earlier shot and to a second phasing error criterion for the later shot that is different from the first phasing error criterion;
   varying a quantity of an earlier shot of the pilot fuel injected in a subsequent engine cycle, based on the comparing the data to the first phasing error criterion, and varying the quantity of a later pilot shot of the pilot fuel injected in the subsequent engine cycle, based on the comparing the data to the second phasing error criterion; and
   autoigniting the pilot fuel to ignite the primary fuel in the cylinder in the subsequent engine cycle.

2. The method of claim 1 wherein the receiving data includes receiving data indicative of a heat release rate (HRR), produced via an in-cylinder pressure sensor.

3. The method of claim 2 wherein each of the first phasing error criterion and the second phasing error criterion includes a different HRR-based limit, and the varying the quantity includes increasing the quantity so as to vary at least one of a timing parameter or an amplitude parameter of an HRR curve in the subsequent engine cycle.

4. The method of claim 1 wherein the varying the quantity includes varying the quantity of the earlier shot according to a first metric and varying the quantity of the second shot according to a second metric different from the first metric.

5. The method of claim 4 wherein the varying includes closed-loop varying, and each of the first metric and the second metric includes a timing-based fuel burned metric.

6. The method of claim 5 wherein the first metric includes a crank angle metric for a relatively larger fuel burned amount, and the second metric includes a crank angle metric for a relatively smaller fuel burned amount.

7. The method of claim 1 wherein the pilot fuel includes a compression-ignition liquid fuel, and the primary fuel includes a gaseous fuel.

8. The method of claim 7 further comprising varying a characteristic of the primary fuel between a preceding engine cycle and the first engine cycle, and wherein the varying the quantity compensates for the varying the characteristic of the primary fuel.

9. An engine system comprising:
   an engine having a cylinder formed therein, and a piston movable in the cylinder;
   a direct fuel injector arranged to directly inject shots of a pilot fuel into the cylinder in a first engine cycle and a subsequent engine cycle;
   a primary fuel admission valve for admitting a primary fuel for combustion in the cylinder based on autoignition of the pilot fuel in the first engine cycle and the subsequent engine cycle;
   a fuel control system including a sensor structured to produce data indicative of a heat release in the cylinder, and a fueling control unit;

the fueling control unit being structured to:
compare the data to phasing error criteria for an earlier shot of the pilot fuel and to different phasing error criteria for a later shot of the pilot fuel, in the first engine cycle; and
vary a quantity of an earlier shot of the pilot fuel in the subsequent engine cycle, based on the comparing the data to the phasing error criteria, and vary a quantify of a later shot of the pilot fuel in the subsequent engine cycle, based on the comparing the data to the different phasing error criteria.

10. The engine system of claim 9 wherein the phasing error criteria include a heat release rate (HRR)-based limit.

11. The engine system of claim 10 wherein the fueling control unit is further structured to vary the quantity of at least one of the earlier pilot shot or the later pilot shot via increasing the quantity so as to vary at least one of a timing parameter or an amplitude parameter of an HRR curve in the subsequent engine cycle.

12. The engine system of claim 10 wherein the phasing error criteria include a first heat release rate (HRR)-based limit and a second HRR-based limit for the earlier shot and the later shot, respectively.

13. The engine system of claim 12 wherein the first HRR-based limit includes an HRR-based limit at a later crank angle timing, and the second HRR-based limit includes an HRR-based limit at an earlier crank angle timing.

14. The engine system of claim 9 wherein the fueling control unit is further structured to vary the quantity according to at least one timing-based fuel burned metric.

15. The engine system of claim 14 wherein the at least one timing-based fuel burned metric includes a first crank angle metric for the earlier shot for a relatively larger fuel burned amount, and a second metric includes a second crank angle metric for the later shot for a relatively smaller fuel burned amount.

16. The engine system of claim 15 wherein the relatively larger fuel burned amount includes a fuel burned amount that is 50% or greater, and the relatively lesser fuel burned amount includes a fuel burned amount that is less than 50%.

17. A dual fuel control system comprising:
a fueling control unit structured to receive data indicative of a heat release in a cylinder produced in a first engine cycle by combustion of a fuel charge including a primary fuel and a plurality of shots of an autoignited pilot fuel;
the fueling control unit being further structured to compare the data to different phasing error criteria for each respective one of the plurality of autoignited shots of the directly injected pilot fuel;
the fueling control unit being further structured to produce a at least one combustion phasing error signal based on the comparison of the data to the different phasing error criteria;
the fueling control unit being further structured to output a first pilot fuel injection command and a second pilot fuel injection command to form a fuel charge of the primary fuel and the pilot fuel in a subsequent engine cycle; and
the fueling control unit being further structured via the first pilot fuel injection command to vary a quantity of an earlier shot of the pilot fuel in the subsequent engine cycle, based on the at least one combustion phasing error signal, and via the second pilot fuel injection command to vary a quantity of a later shot of the pilot fuel, based on the at least one combustion phasing error signal.

18. The dual fuel control system of claim 17 wherein the phasing error criteria include a heat release rate (HRR)-based limit.

19. The dual fuel control system of claim 18 wherein the phasing error criteria include a first HRR-based limit and a second HRR-based limit specific, respectively, to the earlier shot and to the later shot of the plurality of shots in the first engine cycle.

20. The dual fuel control system of claim 18 wherein the fueling control unit is further structured to output a plurality of pilot fuel injection commands varying a quantity of at least one shot of the pilot fuel in each of a plurality of subsequent engine cycles closed loop according to a timing-based fuel burned metric.

* * * * *